Sept. 8, 1964
S. E. MOONEY
3,147,888
REFRIGERATED DISPENSER
Filed Sept. 15, 1961
3 Sheets-Sheet 1
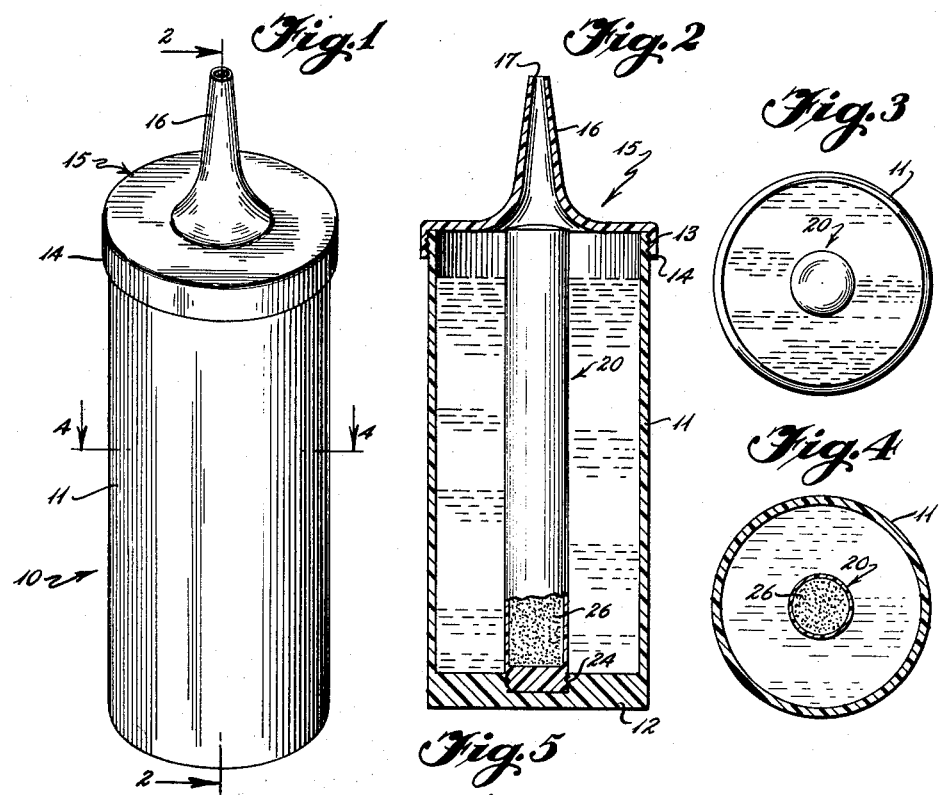
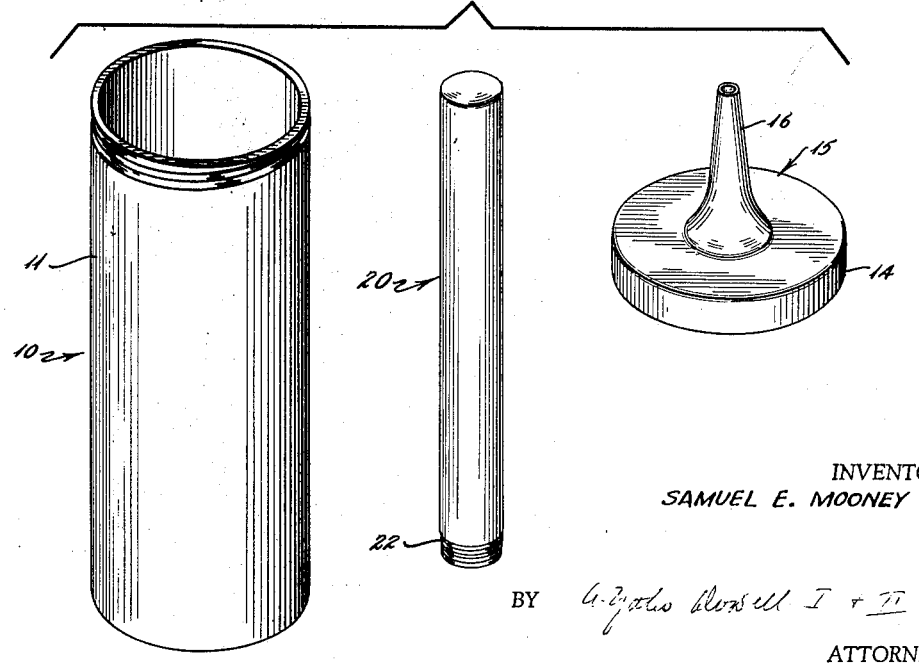
INVENTOR
SAMUEL E. MOONEY
BY
ATTORNEY

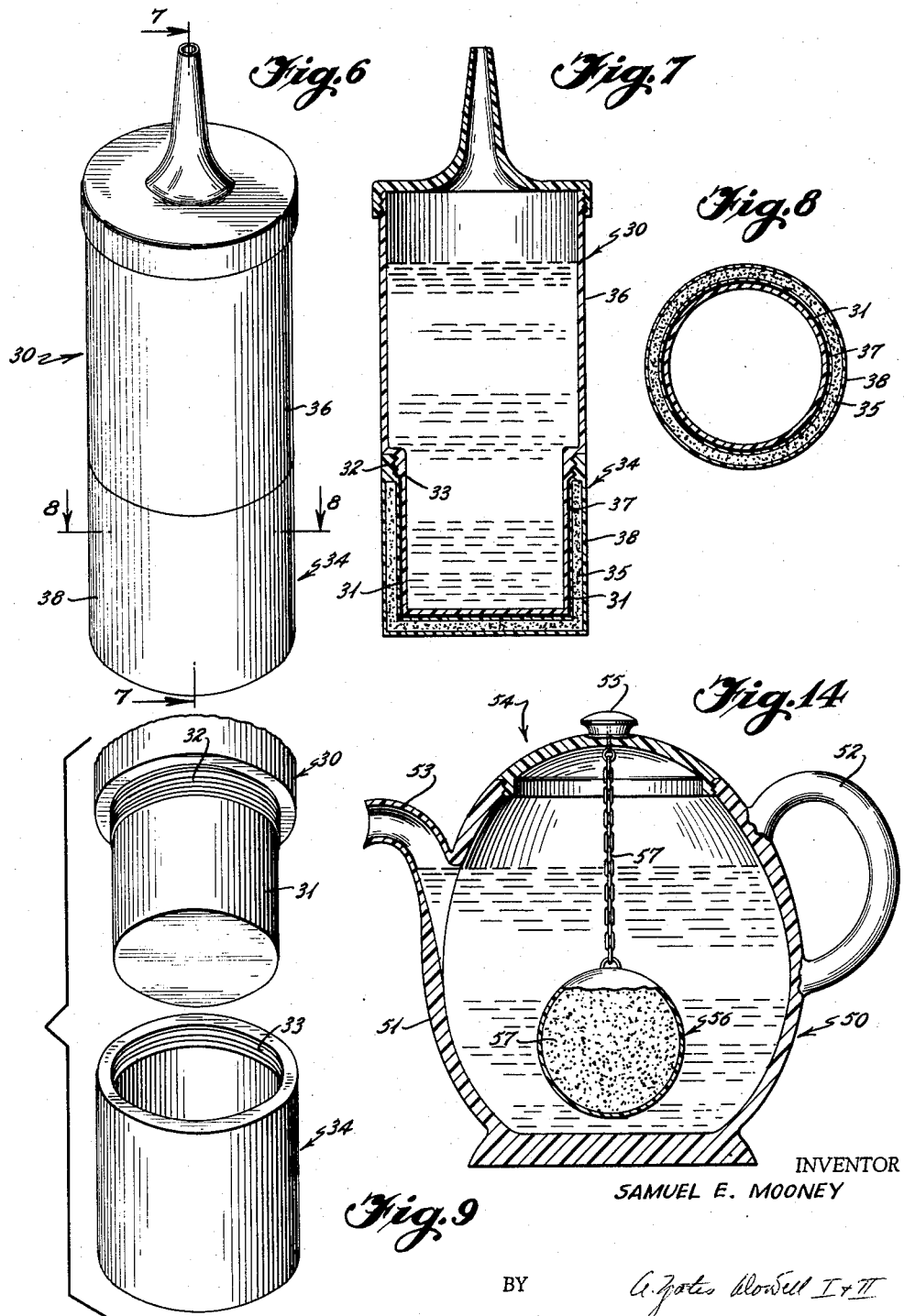

Sept. 8, 1964  S. E. MOONEY  3,147,888
REFRIGERATED DISPENSER

Filed Sept. 15, 1961  3 Sheets-Sheet 3

INVENTOR
SAMUEL E. MOONEY

BY *Gates Powell I & II*

ATTORNEY

United States Patent Office 3,147,888
Patented Sept. 8, 1964

3,147,888
REFRIGERATED DISPENSER
Samuel E. Mooney, 1351 28th St., Orlando, Fla.
Filed Sept. 15, 1961, Ser. No. 138,315
1 Claim. (Cl. 222—130)

This invention relates to the serving and preservation of comestibles and more particularly to a refrigerated self-service dispenser for liquids such as cream which are in constant demand where food is served but which deteriorate unless refrigerated.

One of the problems in the serving of food, particularly in commercial establishments, has been the providing of cream for coffee and other purposes. Cream, like the table condiments, is in frequent demand. Unlike them, however, it spoils at room temperature in a relatively short time. Resultantly, much becomes unfit for use and is wasted and many cups of coffee are rendered less satisfactory by having spoiled cream therein, such spoilage not being apparent until the cream is poured into the coffee.

Attempts to solve the problem by keeping the cream in a refrigerator until required are frustrated due to the incessant demand.

Accordingly, it is an object of the present invention to provide a relatively low cost container adapted for the self-service dispensing of liquids such as cream and which has a built-in element for refrigerating the liquid for a substantial period of time.

A further object is to provide a relatively low cost container adapted for mass production and which is suitable for use at restaurants ranging from the most to the least expensive.

Figure 10:
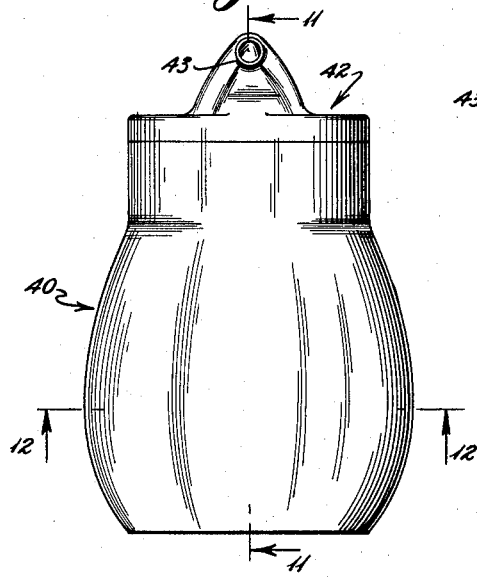
Figure 11:
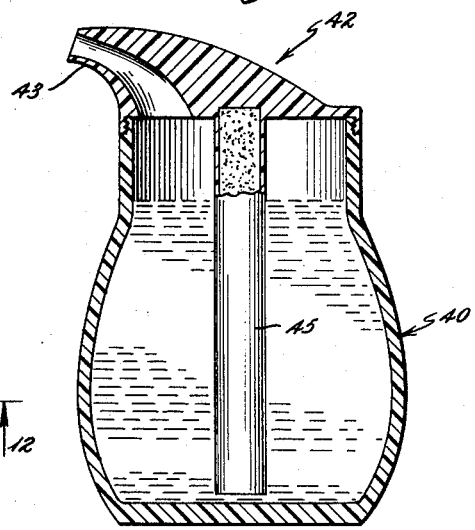
Figure 12:
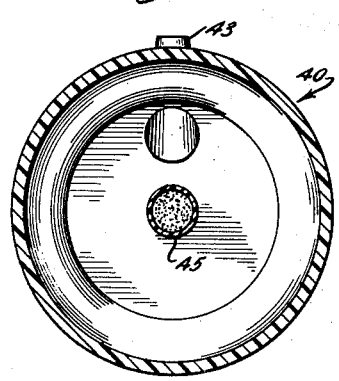
Figure 13:
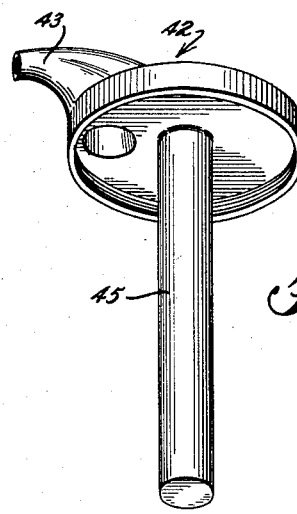

These and other objects of the invention will become apparent from the following description in conjunction with the drawings, in which:

FIG. 1 is a perspective of a preferred form of the invention;

FIGS. 2 and 4, sections on the lines 2—2 and 4—4 of FIGS. 1 and 2, respectively;

FIG. 3, a plan view with the top removed;

FIG. 5, an exploded view of the separable elements of the device;

FIG. 6, a perspective of a modified form of the invention;

FIGS. 7 and 8, sections on the lines 7—7 and 8—8, respectively, of FIG. 6;

FIG. 9, an exploded view of the lower portion of the liquid container and the refrigerating jacket;

FIG. 10, an elevation of a further modification;

FIGS. 11 and 12, sections on the lines 11—11 and 12—12, respectively of FIG. 10;

FIG. 13, a perspective of the lid and cooling tube of the device of FIG. 10; and FIG. 14, a vertical section of a further modification.

Briefly stated, the present invention includes a container of generally well known type modified by the provision of an integral cooling member. In one form of the invention the container may be of the "squeeze bottle" type, having a cap with a spout mounted at one end of a cylinder in which dispensing through the restricted discharge opening is effected by inverting the container and squeezing the cylindrical body. Mounted within or jacketing a portion of the container is a refrigerating member in the form of a sealed container of material having a relatively high heat capacity, such as water. Prior to use of the device the cream or other substance is preferably refrigerated at the desired temperature for use and the refrigerating member is cooled to a much lower temperature. Upon the assembly of the device the refrigerating member cools the cream or other liquid in the container sufficiently to offset the heat gained in order to maintain the temperature of the liquid at the desired level for a substantial period of time or until the container is empty. In a modified form a pitcher type container has an inner sealed refrigerated container suspended therewithin.

With further reference to the drawings, and particularly FIGS. 1–5, there is illustrated a dispensing container 10, which may be generally of the plastic squeeze bottle type commonly used in restaurants for mustard and tomato ketchup. The container includes a lower cylindrical portion having side walls 11 and a relatively thick bottom wall 12, the upper rim of the side walls having threads 13 for receiving mating threads on the flange 14 of the top 15 which has a dispensing spout 16 with a restricted discharge outlet 17.

The container thus far described is constructed of a relatively soft plastic well known in the art and is easily depressible manually in order to discharge the contents when the device is inverted. Mounted within the container is a tube 20 whose diameter is only a fraction of that of the container and which extends the length thereof. The tube is sealed and has a threaded end portion 22 for reception in a threaded recess 24 in the bottom wall 12 of the container 10.

Within the tube 20 is a substance 26 preferably having a high heat capacity, such as water, which is frozen prior to use.

In the use of the device the tube 20 is refrigerated in the freezing compartment of the refrigerator so that the substance 26 forms ice at a relatively low temperature. The tube 20 may be refrigerated either separately or mounted within the empty container, depending on the convenience of the user or the operator of a restaurant. With the tube mounted in place the cream or other liquid at an appropriate temperature for its preservation and use is placed in the container 10 and the top attached.

During exposure of the filled container to room temperature, heat transfer occurs through the wall thereof to the contained liquid. However, such heat transfer is compensated by the cooling effect of the tube 20 and as a result the liquid is maintained at an appropriate temperature.

The tube 20 may be constructed of a material which will permit heat transfer from the liquid in the container to the substance in the tube at a rate approximating that of heat transfer from the room or other space through the walls of the container to the liquid within.

It is contemplated that the tube 20 may be formed of plastic material which is sufficiently flexible to permit expansion of the substance, such as water, therewithin when the latter freezes, without damaging the tube. By ushing such material for the tube its handling at sub-freezing temperature by restaurant personnel is simplified.

In the modification of FIGS. 6–8 the container 30 has a base portion 31 of reduced diameter and with threads 32 at the upper rim of said reduced part for receiving the threads 33 at the upper rim of an outer jacket 34. The container 30 is of the squeeze bottle type previously described, except for the modification of the lower portion. The jacket or shell 34 is hollow and has a base 35 for a substance 36, such as water, previously described. It is contemplated that the inner wall 37 of the shell 34 may be relatively thin as compared to its outer wall 38. Hence, heat transfer from the shell to the contents of the container will be facilitated and that from the room to the jacket diminished.

In the use of the device, FIGS. 6–8, it is contemplated that the jacket will be cooled to sub-freezing temperature before use, being cooled separately or attached to the empty container. When the container is filled for use the liquid may be discharged by inverting the same and depressing the upper portion 36. The shell about the lower portion of the container reduces the area for heat transfer to the contents and absorbs heat from the latter at a rate adapted to keep the contents at an appropriate temperature. When the container has been in use for a time and the contents are low, as, for example, one half full or less, then the heat transfer from the room is greatly decreased due to the fact that the liquid is within the shell 34.

In the modification of FIGS. 10–13 a pitcher type container is illustrated. The container 40 is preferably of a low heat transfer material such as glass or plastic and has a top 42 threadedly engaging the lower portion and a pouring spout 43. Integral with or separably connected to the top is a tube 45 which when the top is attached depends centrally within the container. The cooling tube contains a substance, such as water, which is cooled at sub-freezing temperature prior to use.

In the modification of FIG. 14 a pitcher type container 50 is illustrated, having a body 51, handle 52 and pouring spout 53 extending from the body. The lid 54 has a knob 55 from which a sealed container 56, which may be spherical, is suspended by a chain 57. Prior to use of the device the sealed container with its substance 57 is refrigerated at sub-freezing temperature in order that it may compensate for heat transfer to the liquid within the container when it is exposed to ambient temperature.

It will be observed that the devices which have been illustrated provide a relatively simple means for compensating for the heat transfer to a substance such as cream when exposed to normal room temperature. Hence, the cream may be kept sweet and ready for use for a relatively long period of time without such deterioration as normally occurs. The refrigerating members occupy little space in a freezing compartment and are easy to wash after use. Under conditions of extreme heat, a member whose cooling capacity has been exhausted may be replaced in the container by a fresh member without loss of liquid content or the necessity for emptying the contents during replacement. In the modification of FIGS. 6–9 the container 30 may be stored upright either with or without the jacket 34.

Although during use, the rate of heat transfer to the refrigerating member decreases as its temperature approaches that of the liquid in the container, the decreasing amount of liquid lessens the cooling capacity requirement. Resultantly, the cream or other liquid should be maintained at an appropriate temperature until exhausted.

Although the devices of the present invention are especially adapted for restaurants and institutions in which a container of cream is constantly in demand, it is also adapted for use at functions such as parties, picnics and the like, at which exposure to relatively high temperature for a substantial period of time occurs.

It will be obvious to one skilled in the art that various changes may be made in the invention without departing from the spirit and scope thereof and therefore the invention is not limited by that which is illustrated in the drawings and described in the specification, but only as indicated in the accompanying claim.

What is claimed is:

A dispenser of the character indicated comprising a pair of concentric cylinders each of uniform diameter, one substantially larger than the other, the larger cylinder containing material to be dispensed and being compressible and having an end wall substantially thicker than its side wall structure, said end wall having a concentric recess therein of a diameter smaller than the diameter of said thicker end wall, the smaller cylinder containing refrigerant and having an end wall substantially thicker than its side wall structure and fixed in said recess, a cap connected to the opposite end of the larger cylinder and having a concentric dispensing spout with an inlet and an outlet, the smaller cylinder having its opposite end located in axially closely spaced relation to the inlet of said dispensing spout in a manner to provide a restricted circular passageway to restrict the flow into said inlet but being adapted to permit increased flow when the pressure is applied to the exterior of the larger cylinder.

References Cited in the file of this patent

UNITED STATES PATENTS

| 2,468,661 | Gladstone | Apr. 26, 1949 |
| 2,925,200 | Cabe | Feb. 16, 1960 |

FOREIGN PATENTS

| 256,156 | Great Britain | Aug. 5, 1926 |